US011046200B2

(12) United States Patent
Kyojo et al.

(10) Patent No.: US 11,046,200 B2
(45) Date of Patent: Jun. 29, 2021

(54) ON-BOARD CONTROL DEVICE

(71) Applicant: Panasonic Intellectual Property Management Co., Ltd., Osaka (JP)

(72) Inventors: Hiroyuki Kyojo, Tokyo (JP); Yutaka Inobe, Kanagawa (JP); Nobuaki Satoh, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 123 days.

(21) Appl. No.: 16/409,011

(22) Filed: May 10, 2019

(65) Prior Publication Data
US 2019/0263279 A1 Aug. 29, 2019

Related U.S. Application Data

(63) Continuation of application No. PCT/JP2017/043398, filed on Dec. 4, 2017.

(30) Foreign Application Priority Data

Dec. 22, 2016 (JP) .............................. JP2016-249839
Feb. 23, 2017 (JP) .............................. JP2017-032605

(51) Int. Cl.
*B60L 53/24* (2019.01)
*B60R 16/023* (2006.01)
(Continued)

(52) U.S. Cl.
CPC .............. *B60L 53/24* (2019.02); *B60L 58/20* (2019.02); *B60R 16/023* (2013.01); *H02J 7/342* (2020.01); *B60L 50/52* (2019.02); *B60Y 2200/91* (2013.01)

(58) Field of Classification Search
CPC ........ H02J 7/342; B60R 16/023; B60L 58/20; B60L 50/52; B60Y 2200/91
See application file for complete search history.

(56) References Cited

U.S. PATENT DOCUMENTS

| 2011/0176281 | A1* | 7/2011 | Ikemoto | .................... B60L 9/00 |
| | | | | 361/729 |
| 2011/0288705 | A1* | 11/2011 | Kawasaki | ............... B60L 50/66 |
| | | | | 701/22 |

(Continued)

FOREIGN PATENT DOCUMENTS

| JP | 2003-175781 | 6/2003 |
| JP | 2013-051745 | 3/2013 |
| JP | 2014-073023 | 4/2014 |

OTHER PUBLICATIONS

International Search Report of PCT application No. PCT/JP2017/043398 dated Mar. 6, 2018.

*Primary Examiner* — Rexford N Barnie
*Assistant Examiner* — Brian K Baxter
(74) *Attorney, Agent, or Firm* — Seed IP Law Group LLP

(57) ABSTRACT

An on-board control device relays data communication between a vehicle module and a vehicle ECU which generates a signal for commanding a driving mode of a vehicle. The on-board control device includes a first interface via which communication with the vehicle ECU is performed, and a second interface via which communication with the vehicle modules is performed. The first interface relies on specifications for communication with the vehicle ECU, and the second interface does not rely on the specifications for communication with the vehicle ECU.

15 Claims, 8 Drawing Sheets

(51) Int. Cl.
  *B60L 58/20* (2019.01)
  *H02J 7/34* (2006.01)
  *B60L 50/52* (2019.01)

(56) References Cited

U.S. PATENT DOCUMENTS

2014/0203786 A1* 7/2014 Oosawa ................ B60L 3/0046
  320/136
2015/0019897 A1* 1/2015 Horihata ............. H04L 12/6418
  713/324

* cited by examiner

ON-BOARD CONTROL DEVICE

CROSS-REFERENCE TO RELATED APPLICATIONS

This application is a U.S. national stage application of the PCT International Application No. PCT/JP2017/043398 filed on Dec. 4, 2017, which claims the benefit of foreign priority of Japanese patent application No. 2016-249839 and No. 2017-032605 filed on Dec. 22, 2016 and Feb. 23, 2017, respectively, the contents all of which are incorporated herein by reference.

BACKGROUND

1. Technical Field

The present disclosure relates to an on-board control device.

2. Description of the Related Art

Electric vehicle (EV) and plug-in hybrid electric vehicle (PHEV) are equipped with power modules such as a high-voltage battery, an inverter that converts a DC power supplied from the high-voltage battery and supplies the converted power to a motor, a charger that converts power (electric power) supplied from an external power source such as commercial alternating current power source and charges the high-voltage battery, a low-voltage battery (auxiliary battery) that supplies power to an auxiliary machine of the vehicle, and a DC/DC converter that charges the auxiliary battery.

These power modules are equipped with electronic control units respectively associated with the power modules. These electronic control units are communicably coupled to a vehicle control unit for comprehensively controlling components of the vehicle via communication interfaces and the like, which conform to the specifications of a CAN (Controller Area Network) communication protocol (see, for example, Japanese Patent Unexamined Publication No. 2014-073023, referred as PTL 1).

SUMMARY

However, as described in PTL 1, in a configuration in which a vehicle control unit and an electronic control unit of each power module are directly connected to each other, with changes of specifications of the communication interface (both or any one of hardware element and software element) of the vehicle control unit, all of the communication interfaces of the electronic control units of the power modules (hereinafter, referred to as "interface" or "IT") need to be changed.

That is to say, all of interfaces of the electronic control units of the power modules need to be changed to new interfaces suitable to the interface of the changed vehicle control unit, thus increasing developing cost.

The present disclosure provides an on-board control device capable of eliminating restrictions to communication between a vehicle control unit and a vehicle module (in particular, a power module).

An on-board control device of the present disclosure relays data communication between a vehicle module and a vehicle ECU configured to generate a signal to command a driving mode of the vehicle. The on-board control device includes a first interface via which communication with the vehicle ECU is performed, and a second interface via which communication with the vehicle modules is performed. The first interface relies on specifications for communication with the vehicle ECU, and the second interface does not rely on specifications for communication with the vehicle ECU.

The on-board control device can eliminate restrictions to communication between the vehicle control unit and the vehicle module.

DETAILED DESCRIPTION OF PREFERRED EMBODIMENTS

Figure 1:
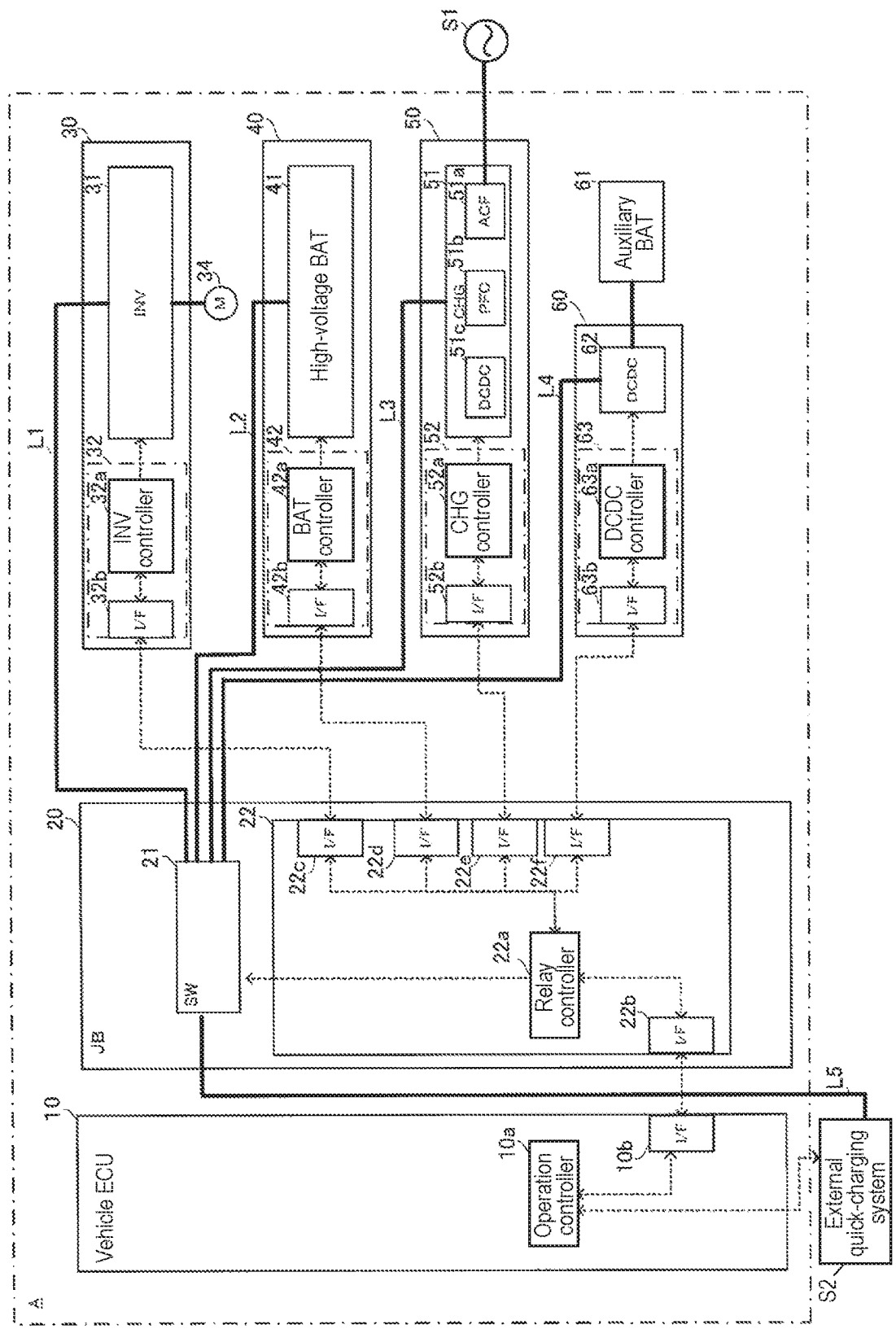
FIG. 1 is a diagram showing an example of a configuration of a vehicle according to a first exemplary embodiment.

Hereinafter, various exemplary embodiments of the present disclosure are described with reference to the drawings. In each exemplary embodiment, the same reference numerals are given to the same components as in the preceding exemplary embodiments and the description thereof may be omitted.

First Exemplary Embodiment

Hereinafter, a relay device according to a first exemplary embodiment (corresponding to the "on-board control device" of the present disclosure) is described with reference to FIG. 1.

FIG. 1 is a diagram showing an example of a configuration of vehicle A according to the first exemplary embodiment. In the drawings, dotted arrows indicate transmission and reception of signals between respective parts, and solid lines indicate power lines.

Vehicle A is, for example, an electric vehicle or a plug-in hybrid electric vehicle, and includes vehicle ECU (Electronic Control Unit) 10, junction box 20, a plurality of power modules (inverter module 30, battery module 40, charge module 50, auxiliary module 60 (hereinafter, also generically referred to as "power modules 30 to 60"), and the like.

Vehicle ECU 10 is a vehicle control unit for comprehensively controlling components of vehicle A. Vehicle ECU 10 includes operation controller 10a, and interface (hereinafter, referred to as "I/F") 10b.

Operation controller 10a generates a command signal in order to allow each of power modules 30 to 60 to perform a desired operation. Operation controller 10a has, for example, a drive command function of issuing an inverter drive command signal in response to the required torque; a charge command function of issuing a charger operation command signal in order to charge high-voltage battery 41; a DC/DC command function issuing a DC/DC converter operation command signal in order to charge auxiliary battery 61; and a quick-charge command function of issuing a quick-charging command in order to charge high-voltage battery 41 from external quick-charging system S2; and the like.

Note here that command signals to be generated by operation controller 10a include, for example, an operation instruction and a stop instruction for each of power modules 30 to 60. Furthermore, the command signals include details of operations of power modules 30 to 60 to be operated (for example, an amount of power to be charged by charge module 50), and the like.

I/F 10b of vehicle ECU 10 performs data communication with I/F 22b of relay device 22. For example, in response to generation of a command signal by operation controller 10a, I/F 10b transmits the command signal to I/F 22b of relay device 22.

Inverter module 30 includes inverter circuit 31, and electronic control unit 32 configured to control inverter circuit 31.

Inverter circuit 31 converts DC power received from high-voltage battery 41 and the like into AC power, and supplies the AC power to motor 34. Furthermore, when motor 34 performs a regenerative operation, inverter circuit 31 converts regenerative power transmitted from motor 34 into DC power, and transmits the DC power to high-voltage battery 41 and the like. Note here that inverter circuit 31 is coupled to junction box 20 via power line L1, and transmits and receives power to and from other power modules via junction box 20.

Electronic control unit 32 includes inverter controller (INV controller) 32a configured to control switching of inverter circuit 31 so that motor 34 performs a desired operation, and I/F 32b configured to perform data communication with I/F 22c of relay device 22.

Battery module 40 includes high-voltage battery 41, and electronic control unit 42 configured to control high-voltage battery 41.

High-voltage battery 41 transmits DC power to inverter circuit 31 and the like in discharging operation, and receives DC power from charger 51 and the like in charging operation. Note here that high-voltage battery 41 is coupled to junction box 20 via power line L2 and transmits and receives power to and from other power modules via junction box 20.

Electronic control unit 42 includes battery controller 42a configured to monitor a state of high-voltage battery 41, and I/F 42b configured to perform data communication with I/F 22d of relay device 22.

Charge module 50 includes charger 51, and electronic control unit 52 configured to control charger 51.

Charger 51 converts AC power supplied from external power source S1 outside the vehicle (for example, single-phase 100 V or single-phase 200 V power source for household use) into DC power, and transmits the DC power to high-voltage battery 41 and the like. Note here that charger 51 is coupled to junction box 20 via power line L3 and transmits and receives power to and from other power modules via junction box 20.

Note here that charger 51 includes, for example, an AC filter (ACF) 51a, power-factor correction circuit (PFC) 51b, DC/DC converter (DCDC) 51c, and the like. Charger controller (CHG controller) 52a controls switching of power-factor correction circuit 51b and DC/DC converter 51c.

Electronic control unit 52 includes charger controller 52a configured to control switching of charger 51, and I/F 52b configured to perform data communication with I/F 22e of relay device 22.

Auxiliary module 60 includes DC/DC converter 62, and electronic control unit 63 configured to control DC/DC converter 62.

Auxiliary battery (auxiliary BAT) 61 is a battery having a voltage lower than that of high-voltage battery 41. DC/DC converter 62 steps down the power supplied from high-voltage battery 41 to charge auxiliary battery 61. Note here that DC/DC converter 62 is coupled to junction box 20 via power line L4 and transmits and receives power to and from other power modules via junction box 20.

Electronic control unit 63 includes DC/DC converter controller (DCDC controller) 63a configured to control switching of DC/DC converter 62, and I/F 63b configured to perform data communication with I/F 22f of relay device 22.

Note here that as the above-mentioned electronic control units 32, 42, 52, and 63, a microcomputer including, for example, CPU (Central Processing Unit), ROM (Read Only Memory), RAM (Random Access Memory), and the like (hereinafter, a microcomputer) is used. Then, functions of controllers 32a, 42a, 52a, and 63a of electronic control units 32, 42, 52, and 63 are implemented by referring a control program or various data stored in a storage (not shown) of, for example, CPU (Central Processing Unit). However, instead of a microcomputer, DSP (Digital Signal Processor) specified to signal processing, and the like, may be used.

Junction box 20 houses power lines L1 to L4 respectively drawn from power modules 30 to 60, power line L5 drawn to be connected to external quick-charging system S2, and the like, and relays power transmission and reception between power modules 30 to 60.

Junction box 20 includes electric path switching circuit (SW) 21 to which power lines L1 to L5 are connected. Electric path switching circuit 21 switches a connection state among power lines L1 to L5. Note here that, electric path switching circuit 21 is configured to include a relay, a fuse, a bus bar, and the like, and switches a connection state among power lines L1 to L5 based on a control signal output from relay controller 22a.

Herein, junction box 20 according to this exemplary embodiment has relay device 22 that relays data communication between vehicle ECU 10 and each of power modules 30 to 60.

Relay device 22 includes relay controller 22a, first I/F 22b that communicates with vehicle ECU 10, and second I/Fs 22c to 22f each of which communicates with an electronic control unit of respective one of power modules 30 to 60.

More specifically, relay device 22 includes, as second I/Fs 22c to 22f for communicating with each of power modules 30 to 60, I/F 22c that communicates with I/F 32b of inverter module 30, I/F 22d that communicates with I/F 42b of battery module 40, I/F 22e that communicates with I/F 52b of charge module 50, and I/F 22f that communicates with I/F 63b of auxiliary module 60.

Herein, first I/F 22b relies on specifications for communication with vehicle ECU 10, and conforms to, for example, a standard of the CAN communication protocol.

On the other hand, second I/Fs 22c to 22f rely on specifications for communicating with electronic control units of power modules 30 to 60, respectively. In other words, second I/Fs 22c to 22f do not rely on specifications for communicating with vehicle ECU 10. For example, second I/Fs 22c to 22f perform communication on a standard different from the standard of the CAN communication protocol. Alternatively, even when the communication relies on the standard of the CAN communication protocol, data different from the data transmitted and received by the communication with the vehicle ECU 10 may be used. Note here that, herein, for convenience of description, second I/Fs 22c to 22f have the same specifications, but may have different specifications.

The "interface" herein denotes an input and output part for performing data communication with another device, and includes both or either hardware elements such as a connection terminal and software elements such as signal processing. Similarly, the "specifications of interface" includes both or either hardware elements such as the number of pins of the connection terminal, and software elements such as data format and signal processing procedure (the same is true hereinafter).

Relay controller 22a converts a signal between first I/F 22b and second I/Fs 22c to 22f. Specifically, relay controller 22a converts a signal received via first I/F 22b (for example, an inverter operation command signal, a charger operation command signal, and a DC/DC converter operation command signal from vehicle ECU 10) into a signal conforming the specifications of second I/Fs 22c to 22f, and transmits the converted signal into power modules 30 to 60 via second I/Fs 22c to 22f, respectively.

Furthermore, relay controller 22a controls electric path switching circuit 21 in response to the command signal from vehicle ECU 10, and switches connection states of power lines L1 to L5 between power modules 30 to 60.

Note here that, relay device 22 includes the above-mentioned microcomputer and/or DSP, and performs a variety of signal processing. Relay controller 22a achieves the above-mentioned functions based on various data and programs for signal conversion between first I/F 22b and second I/Fs 22c to 22f, or a signal processing circuit.

As an example, an operation of relay controller 22a when first I/F 22b receives a charger operation command signal from vehicle ECU 10 is described.

At this time, relay controller 22a converts the charger operation command signal into a signal that conforms specification at the time of communication with charge module 50 (the specifications of second I/F 22e) and transmits this converted charger operation command signal to charge module 50 via second I/F 22e. Furthermore, at this time, relay controller 22a controls electric path switching circuit 21 so as to allow circuit 21 to electrically connect charger 51 to high-voltage battery 41.

On the other hand, charger controller 52a of charge module 50 obtains a charger operation command signal from vehicle ECU 10 via I/F 52b. Thus, charger controller 52a allows charger 51 to execute corresponding controlling. At this time, since charger 51 and high-voltage battery 41 are electrically connected to each other via electric path switching circuit 21, charger 51 charges high-voltage battery 41 under control of charger controller 52a.

In this way, in the present exemplary embodiment, vehicle ECU 10 and each of power modules 30 to 60 do not directly communicate with each other, but they communicate with each other via relay device 22.

Therefore, even when vehicle ECU 10 is changed, or each of power modules 30 to 60 is applied to different vehicle ECUs 10, it is unnecessary to change each of power modules 30 to 60 by changing relay device 22 (or junction box 20 having relay device 22).

More specifically, when specifications for communication with vehicle ECU 10 are changed, first I/F 22b and relay controller 22a of relay device 22 are changed so as to correspond to the specifications for communications with I/F 10b of vehicle ECU 10. On the other hand, second I/Fs 22c to 22f respectively communicating with power modules 30 to 60 do not depend on the specifications of I/F 10b of vehicle ECU 10, and are not changed.

Therefore, it is not necessary to change each of I/F 32b, 42b, 52b, and 63b of power modules 30 to 60 in accordance with the change of I/F 10b of vehicle ECU 10, thus, it is possible to suppress manufacturing cost for developing each of new power modules 30 to 60. Furthermore, such a configuration can use a dedicated component instead of a standard line (for example, a standard CAN communication protocol).

Note here that, examples of change of specifications of I/F 10b of vehicle ECU 10 include both change of a hardware element and a software element as mentioned above. Examples thereof include a change of a standard of a signal line (a change of a standard line of the CAN communication protocol to a signal line of a dedicated signal line), a change of presence or absence of specific signal lines (a change of number of buses), a change of types of data to be transmitted and received in the signal line, and the like.

As mentioned above, use of relay device 22 according to this exemplary embodiment enables communication between vehicle ECU 10 and power modules 30 to 60 regardless of specifications of the interface of vehicle ECU 10 or specifications of the interfaces of power modules 30 to 60. Therefore, the vehicle can be designed by freely combining vehicle ECU 10 and power modules 30 to 60 without being restricted by communication means.

Furthermore, with relay device 22 according to this exemplary embodiment, a signal line drawn to be connected to a control system from each of power modules 30 to 60 or an abnormality detection line (not shown) can be shortened, thus contributing to reduction of power consumption and saving space.

Note here that, it is more desirable that relay device 22 be set in a housing of junction box 20. Thus, when, for example, a sensor for monitoring a state of power transmission and reception of relay device 22 is provided (mentioned later in a fourth exemplary embodiment), a communication line between relay device 22 and the sensor can be shortened, and an electromagnetic noise to adversely affect the communication can be suppressed. This is useful because highly accurate detection can be performed.

Second Exemplary Embodiment

Figure 2:
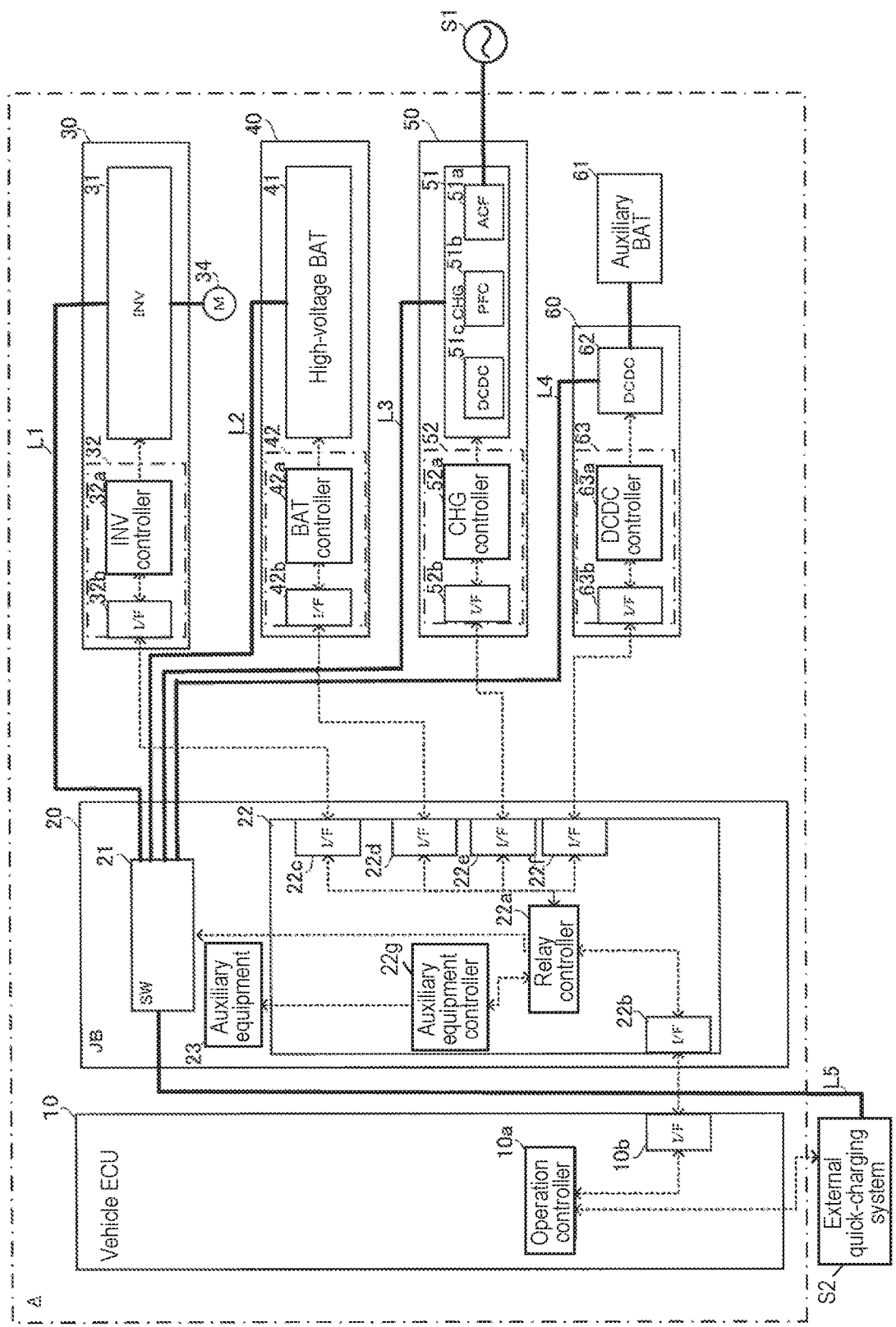
FIG. 2 is a diagram showing an example of a configuration of a vehicle according to a second exemplary embodiment.

FIG. 2 is a diagram showing an example of a configuration of vehicle A according to a second exemplary embodiment.

FIG. 2 is different from the first exemplary embodiment in that auxiliary equipment 23 is newly provided in junction box 20, and relay device 22 has auxiliary equipment controller 22g that controls auxiliary equipment 23. Note here that, description of configurations common to those of the first exemplary embodiment is omitted. Hereinafter, the same is true to the other exemplary embodiments.

Auxiliary equipment 23 is an apparatus that implements additional functions of any one of power modules 30 to 60, and whose necessity varies depending on types or models of vehicles. Examples of auxiliary equipment 23 include a fan and the like for cooling charger 51. In a case where auxiliary equipment 23 is a fan, auxiliary battery 6 supplies power to the fan.

In cases where the output power of charger 51 is different depending on types or models of vehicles, a cooling method may be different depending on the output power. For example, in a case where the output power is high, a water cooling method is used, and in a case where the output power is low, an air cooling method is used.

Herein, for example, an air cooling method needs a fan and a controller for controlling the fan. As such a controller, usually, an electronic control unit of charge module 50 is used.

Therefore, if such auxiliary equipment 23 is installed in each of power modules 30 to 60, in order to correspond to various types and models of vehicles, it becomes necessary to develop both a power module equipped with auxiliary equipment 23, and a power module that is not equipped with auxiliary equipment 23. In a case where, for example, charge module 50 has a fan for cooling charger 51, it is necessary to develop both charge module 50 having a fan and charge module 50 that does not have a fan. As a result, the degree of freedom to individually select whether or not a power module is allowed to implement additional functions is limited.

On the contrary, in this exemplary embodiment, auxiliary equipment 23 is incorporated with junction box 20, and, instead of electronic control units of power modules 30 to 60, auxiliary equipment controller 22g of relay device 22 controls an operation of auxiliary equipment 23. In other words, auxiliary equipment controller 22g functions as a controller for auxiliary equipment 23.

Relay controller 22a according to this exemplary embodiment, in response to, for example, a command signal from vehicle ECU 10, transmits the command signal to each of power modules 30 to 60, and transmits the same command signal also to auxiliary equipment controller 22g. Thus, auxiliary equipment controller 22g operates auxiliary equipment 23 in response to the command signal.

As mentioned above, according to this exemplary embodiment, by changing only junction box 20, it is not necessary to change or develop each of power modules 30 to 60 depending on whether or not auxiliary equipment 23 is required. Thus, the manufacturing cost can be suppressed. In other words, for each vehicle, additional functions of power modules 30 to 60 can be changed variously.

Note here that, in FIG. 2, relay controller 22a and auxiliary equipment controller 22g are shown separately, but both relay controller 22a and auxiliary equipment controller 22g may be achieved by one microcomputer or DSP.

Third Exemplary Embodiment

Figure 3:
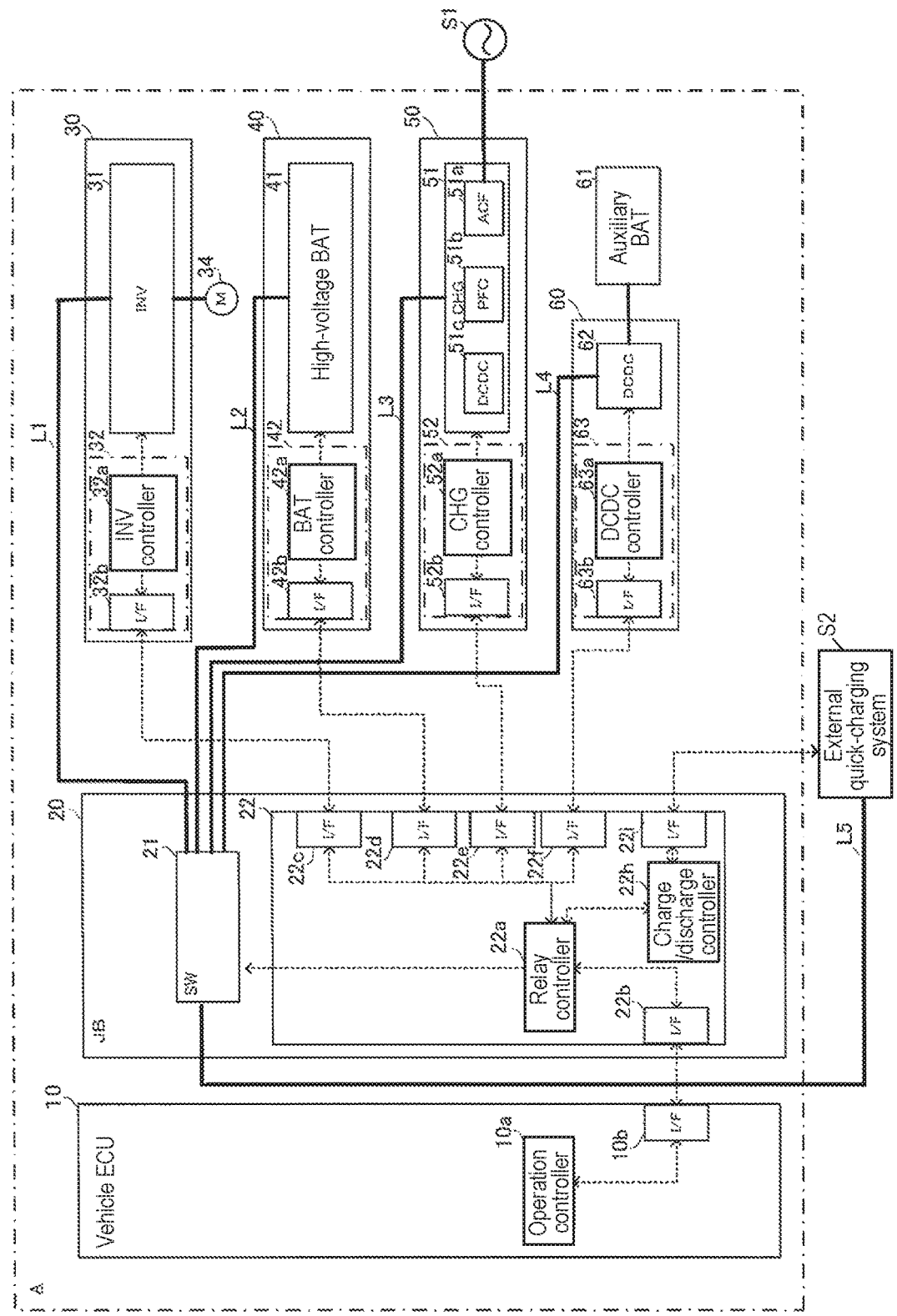
FIG. 3 is a diagram showing an example of a configuration of a vehicle according to a third exemplary embodiment.

FIG. 3 is a diagram showing an example of a configuration of vehicle A according to a third exemplary embodiment.

Relay device 22 according to this exemplary embodiment is different from relay device 22 according to the first exemplary embodiment in that it further includes charge/discharge controller 22h.

Charge/discharge controller 22h has a function of obtaining a charge state of high-voltage battery 41 and executing charge and discharge in high-voltage battery 41, and generates a command signal to be transmitted to battery module 40 and charge module 50. In the first exemplary embodiment, vehicle ECU 10 has this function. In this exemplary embodiment, however, without receiving a command signal from vehicle ECU 10, relay device 22 mainly generates a command signal by charge/discharge controller 22h.

In other words, in this exemplary embodiment, relay device 22 has a function relating to control during parking of the vehicle, while vehicle ECU 10 has a function relating to control during driving of the vehicle.

Examples of the function relating to control during parking include a charge command function of obtaining a charge state of high-voltage battery 41 and transmitting a charger operation command signal to charge module 50; a DC/DC command function of transmitting a DC/DC converter operation command signal to auxiliary module 60 in response to the charge state of auxiliary battery 61; and a quick-charge command function of performing communication with external quick-charging system S2 and controlling electric path switching circuit 21 to charge high-voltage battery 41, and the like. Charge/discharge controller 22h generates a command signal so that relay device 22 achieves the above-mentioned functions.

In addition, in a case where charger 51 is a bidirectional charging circuit capable of converting power in both directions, or has a configuration capable of outputting power from vehicle A to outside of the vehicle via power line L5, examples of the function relating to control during parking may include an external discharge command function (V2H/V2G function). According to the external discharge command function, a charge state of high-voltage battery 41 is obtained and an operation command signal for the bidirectional charging circuit is transmitted to charge module 50, or a discharge command signal to control discharged power to the outside of the vehicle is generated.

Furthermore, examples of the function relating to control during driving include a drive command function by which an inverter drive command signal corresponding to a required acceleration torque is transmitted to inverter module 30.

When relay device 22 has a quick-charge command function, relay device 22 has I/F 22i for communicating with external quick-charging system S2. Charge/discharge controller 22h performs communication with external quick-charging system S2 via I/F 22i, generates a switching command signal to switch electric path switching circuit 21, and switches electric path switching circuit 21 such that external quick-charging system S2 and high-voltage battery 41 are electrically connected to each other. Thus, high-voltage battery 41 is charged with the power supplied from external quick-charging system S2.

As mentioned above, relay device 22 according to this exemplary embodiment has a configuration in which relay device 22 has a part of the functions of the vehicle ECU 10 according to the first exemplary embodiment. Thus, the charge control and the like during parking can be executed only by communication between relay device 22 and each of power modules 30 to 60 (charge module 50 and battery module 40). This makes it possible to control each of power modules 30 to 60 without communication loss (delay) as compared with the case where communication is performed between vehicle ECU 10 and each of power modules 30 to 60 via relay device 22.

Furthermore, in the case where relay device 22 has the function relating to control during parking, processing load of vehicle ECU 10 during parking is reduced. Consequently, vehicle ECU 10 can be made in a low power consumption state, and power consumption during parking can be reduced.

Furthermore, also during driving, relay device 22 can execute charge and discharge control (for example, a DC/DC command function) between power modules 30 to 60. In other words, relay device 22 according to this exemplary embodiment, in place of vehicle ECU 10, can comprehensively execute operation control of the power system. Therefore, as the control system becomes complicated, the processing load of vehicle ECU 10 can be reduced.

Note here that, in this case, relay device 22 preferably manages a state of each of power modules 30 to 60 in a storage part (not shown) provided in relay device 22.

Furthermore, as in this exemplary embodiment, in the case where vehicle ECU 10 has a drive command function, communication between vehicle ECU 10 and inverter module 30 may be performed directly not via relay device 22.

In this case, control during driving is mainly performed by vehicle ECU 10. Thus, processing load of relay device 22 during driving can be reduced.

Furthermore, in FIG. 3, relay controller 22*a* and charge/discharge controller 22*h* are shown separately, but both relay controller 22*a* and charge/discharge controller 22*h* may be achieved by one microcomputer or DSP.

Fourth Exemplary Embodiment

Figure 4:
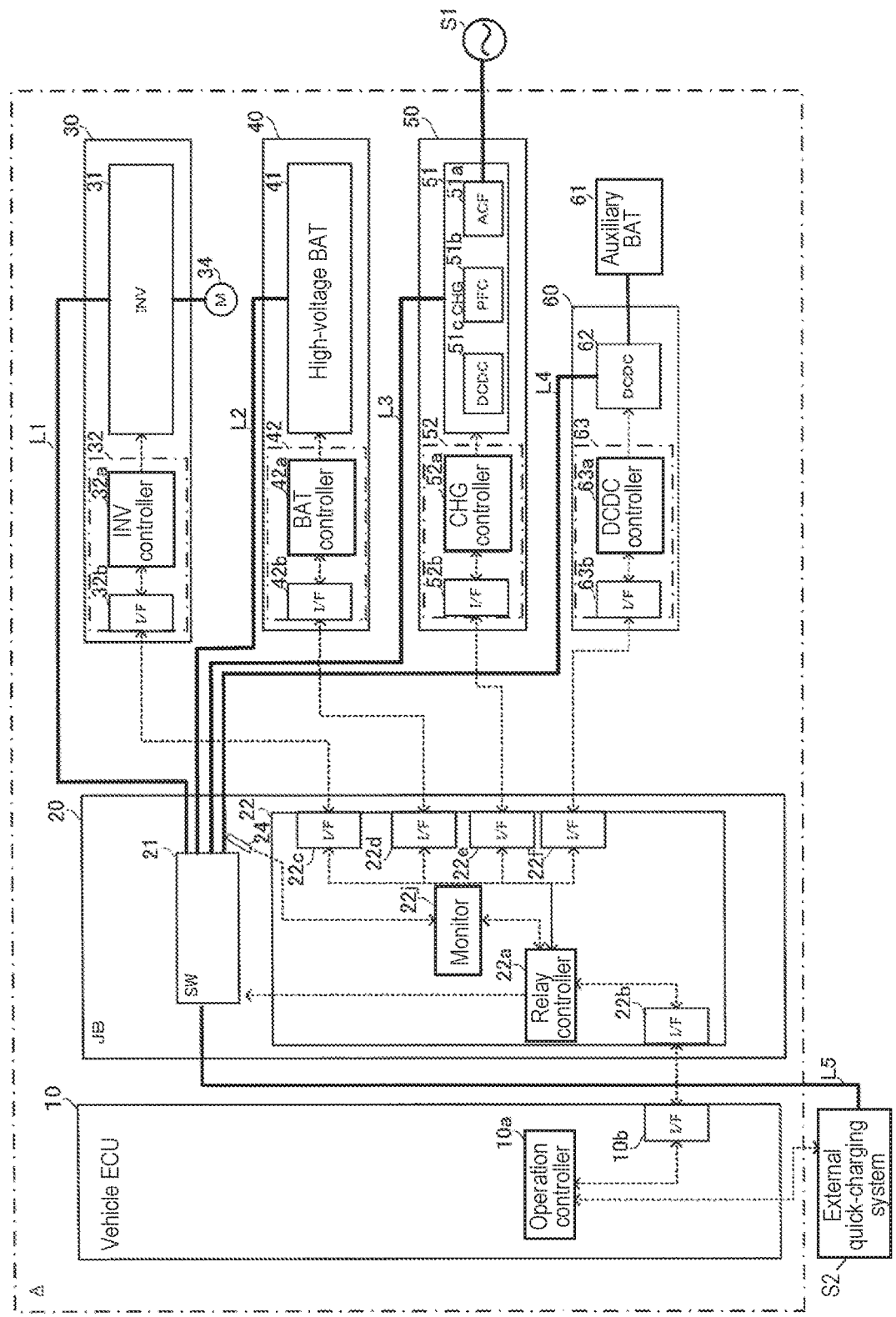
FIG. 4 is a diagram showing an example of a configuration of a vehicle according to a fourth exemplary embodiment.

FIG. 4 is a diagram showing an example of a configuration of vehicle A according to a fourth exemplary embodiment.

Relay device 22 according to this exemplary embodiment is different from the first exemplary embodiment in that it further includes monitor 22*j*.

Monitor 22*j* obtains a detected signal from sensor 24 which detects the electric current (or voltage) flowing in each of power lines L1 to L5 provided in junction box 20, and monitors a state of power transmission and reception between power modules 30 to 60, based on the detected signal.

When, for example, abnormality in a state of the power transmission and reception is detected, monitor 22*j* generates an abnormality notification signal, and notifies the abnormality of relay controller 22*a*. Then, when relay controller 22*a* receives the abnormality notification signal from monitor 22*j*, it notifies the occurrence of abnormality of the related power module(s) and vehicle ECU 10. Furthermore, relay controller 22*a* controls electric path switching circuit 21, and cut off the corresponding electric path.

In this way, relay device 22 according to this exemplary embodiment can monitor a state of power transmission and reception between power modules 30 to 60, and control the related power module(s) in response to the state of the power transmission and reception at an early stage (for example, an operation stop command).

Note here that, in FIG. 4, relay controller 22*a* and monitor 22*j* are shown separately, but both relay controller 22*a* and monitor 22*j* may be achieved by one microcomputer or DSP.

Fifth Exemplary Embodiment

Figure 5:
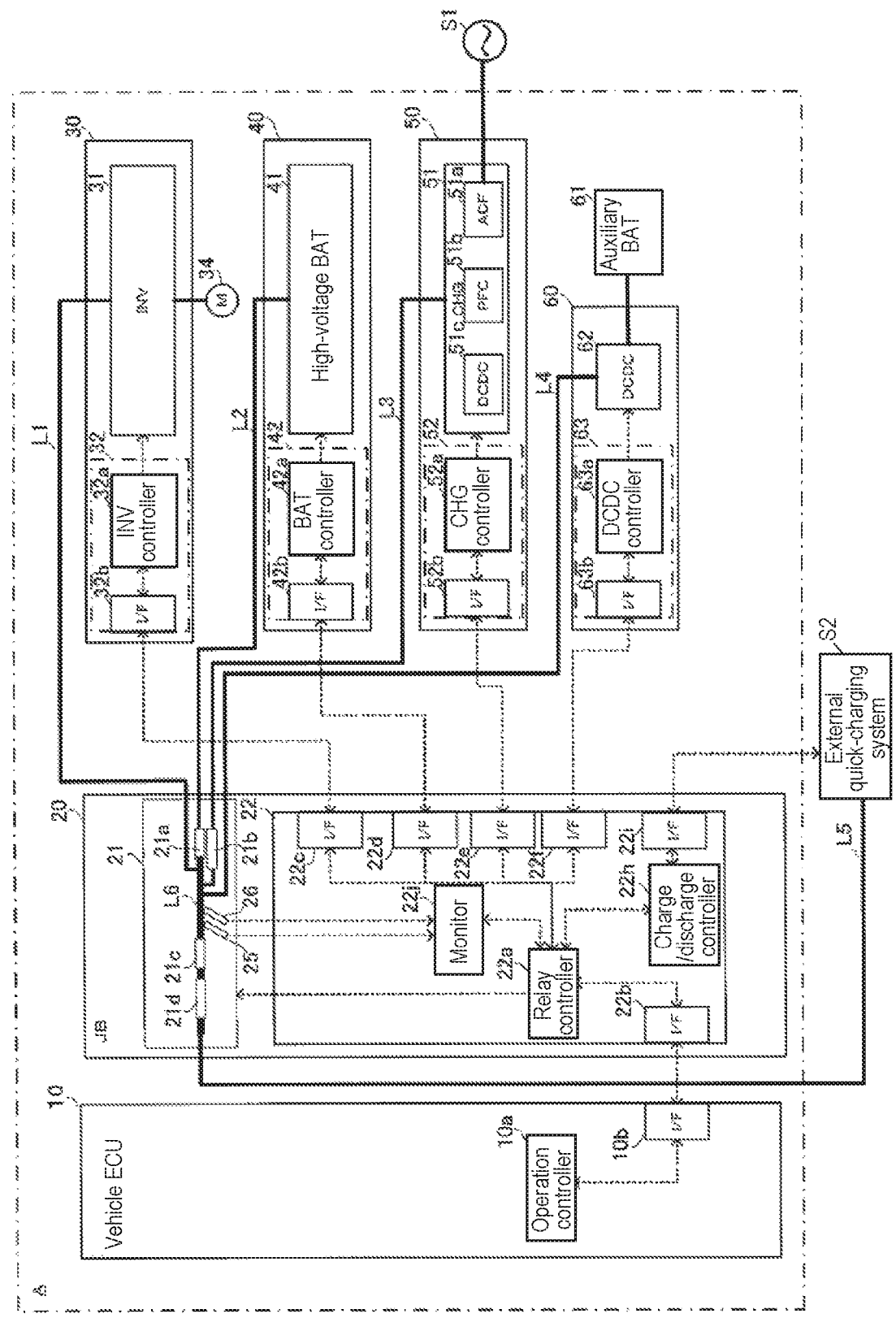
FIG. 5 is a diagram showing an example of a configuration of a vehicle according to a fifth exemplary embodiment.

FIG. 5 is a diagram showing an example of a configuration of vehicle A according to a fifth exemplary embodiment.

Vehicle A according to this exemplary embodiment is different from the fourth exemplary embodiment in that vehicle A according to this exemplary embodiment includes main power line L6, current sensor 25, and voltage sensor 26. Power lines L1 to L5 are connected to main power line L6 which is disposed inside electric path switching circuit 21. Current sensor 25 detects an electric current flowing in main power line L6, and voltage sensor 26 detects a voltage applied to main power line L6. Note here that, similar to the fourth exemplary embodiment, relay controller 22*a* and monitor 22*j* are shown separately, but both relay controller 22*a* and monitor 22*j* may be achieved by one microcomputer or DSP.

Furthermore, in this exemplary embodiment, similar to the third exemplary embodiment, relay device 22 has a function relating to control during parking. Therefore, relay device 22 has charge/discharge controller 22*h*, but similar to the third exemplary embodiment, relay controller 22*a* and charge/discharge controller 22*h* may be configured by one microcomputer or DSP.

In this exemplary embodiment, power line L2 is coupled to main power line L6 via relay 21*a*, power line L3 is coupled to main power line L6 via fuse 21*b*; power line L5 is coupled to main power line L6 via fuse 21*c* and relay 21*d*, and power lines L1 and L4 are directly coupled to main power line L6.

Note here that in this exemplary embodiment, power transmission and reception between power modules 30 to 60 are performed by, for example, main power line L6, control of switching of relay 21*a* and relay 21*d*, and control of each of power modules 30 to 60 (switching control of inverter circuit 31 of inverter module 30, charger 51 of charge module 50, and DC/DC converter 62 of auxiliary module 60).

Voltage sensor 26 detects a voltage to be applied to main power line L6, and detects a voltage to be applied to each of power lines L1 to L5. Furthermore, current sensor 25 detects an electric current flowing in main power line L6.

Similar to the fourth exemplary embodiment, in relay device 22 according to this exemplary embodiment, monitor 22*j* obtains detected signals from voltage sensor 26 and current sensor 25 at a predetermined timing (for example, every 0.1 seconds), and transmits the detected signals to relay controller 22*a*. Relay controller 22*a* transmits the detected signals from monitor 22*j* to predetermined power modules 30 to 60 in response to reception of the detected signals. Note here that, relay controller 22*a* may transmit the detected signals to objects, among power modules 30 to 60, to which the detected signals are to be transferred and which are set in the storage in advance.

In this way, with the configuration in which power lines L1 to L5 are connected to main power line L6, and which includes current sensor 25 for detecting the electric current of main power line L6, and voltage sensor 26 for detecting the voltage applied to main power line L6, it is possible to reduce a part of sensors which has conventionally been possessed by each of power modules 30 to 60. That is to say, it is possible to reduce cost.

Specifically, all or a part of roles of a voltage sensor for detecting an output voltage of charger 51, a voltage sensor for detecting a voltage supplied from external quick-charging system S2, and a voltage sensor for detecting a voltage to be input into DC/DC converter 62 and the like, can be integrated into a voltage sensor for detecting a voltage to be applied to main power line L6.

Sixth Exemplary Embodiment

Figure 6:
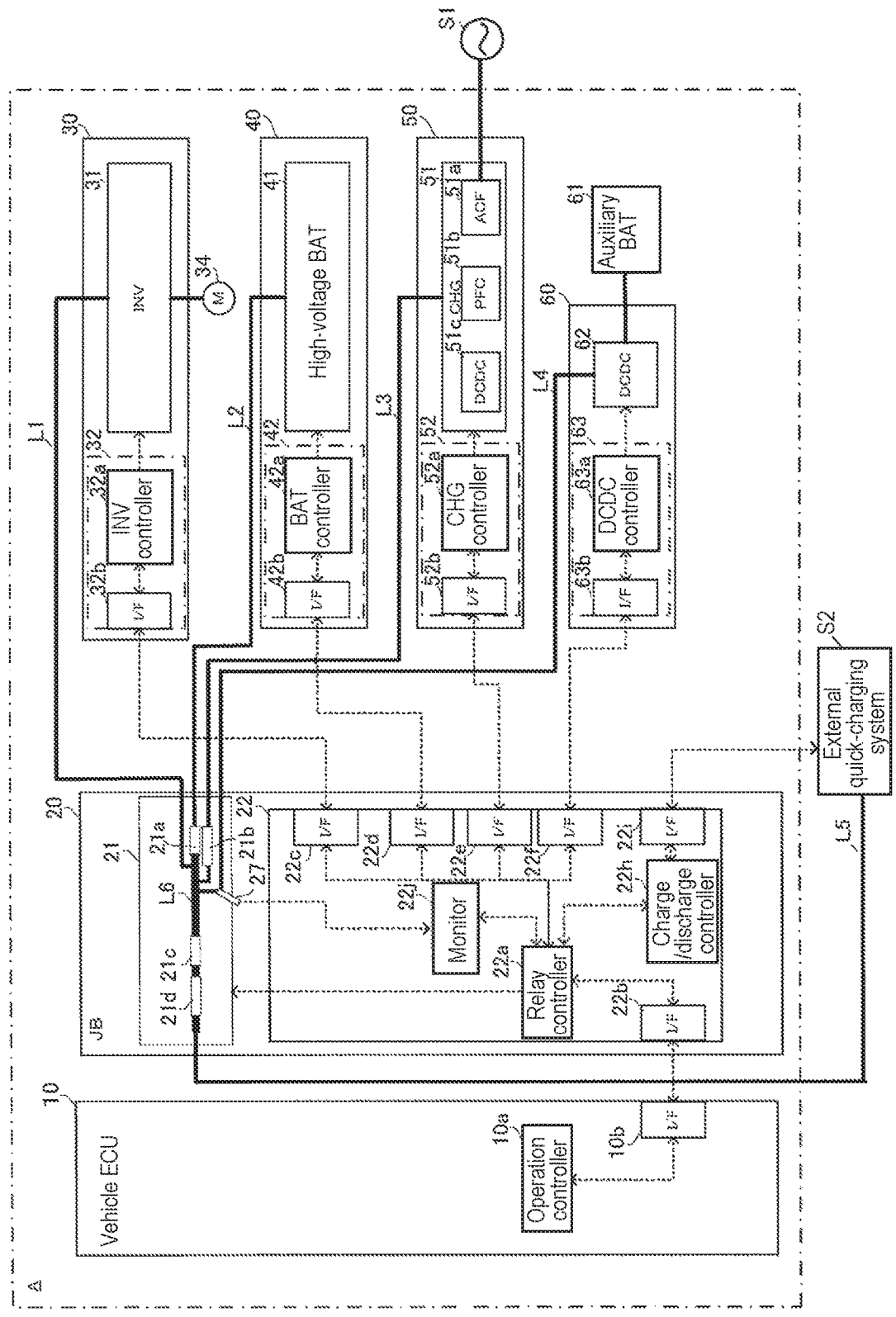
FIG. 6 is a diagram showing an example of a configuration of a vehicle according to a sixth exemplary embodiment.

FIG. 6 is a diagram showing an example of a configuration of vehicle A according to a sixth exemplary embodiment.

Vehicle A according to this exemplary embodiment is the same as in the fifth exemplary embodiment in that main power line L6 is provided inside electric path switching circuit 21, and is different from the fifth exemplary embodiment in that current sensor 27 configured to detect an electric current flowing in power line L4 of DC/DC converter 62 is provided instead of current sensor 25 and voltage sensor 26.

As mentioned above, with the configuration in which power lines L1 to L5 are connected to main power line L6, power line L3 of charger 51 is coupled to power line L2 of high-voltage battery 41 via main power line L6, and also coupled to power line L4 of DC/DC converter 62 via main power line L6.

With such a configuration, while charger 51 is charging high-voltage battery 41, and when DC/DC converter 62 is operated in order to charge auxiliary battery 61 simultaneously, the output power of charger 51 will be supplied to both high-voltage battery 41 and DC/DC converter 62.

Herein, when high-voltage battery 41 is charged by, for example, a Constant Current-Constant Voltage (CCCV) charging method, for shortening charging time, charger 51 preferably increases an electric current to be supplied to high-voltage battery 41 up to a maximum electric current that is allowed by high-voltage battery 41 (hereinafter, referred to as a "maximum allowable current").

However, while charger 51 is outputting power so as to be the predetermined maximum allowable current, and, at the same time, when DC/DC converter 62 is operated, a part of electric current supplied from charger 51 is divided into DC/DC converter 62. As a result, high-voltage battery 41 is charged with an electric current that is smaller than the maximum allowable current. Thus, charging time may be prolonged.

From such a viewpoint, this exemplary embodiment has a configuration in which current sensor 27 for detecting an electric current divided into power line L4 of DC/DC converter 62 is provided, and charger 51 can be allowed to control the output current with this divided electric current taken into consideration.

A signal path through which a detected signal from current sensor 27 is transmitted is the same as that in the fourth exemplary embodiment. In other words, in relay device 22, monitor 22j obtains a detected signal from current sensor 27, and transmits the detected signal to electronic control unit 52 of charge module 50 via relay controller 22a.

Electronic control unit 52 of charge module 50 controls charger 51 so that an output electrical current from charger 51 becomes the sum of the preset maximum allowable current and an electric current divided to DC/DC converter 62, in response to the reception of the detected signal from current sensor 27.

In this way, according to this exemplary embodiment, even when DC/DC converter 62 is operated at the same time when high-voltage battery 41 is charged, high-voltage battery 41 can be charged with a maximum allowable current, and thus a charging time can be shortened.

Modified Example of Sixth Exemplary Embodiment

Figure 7:
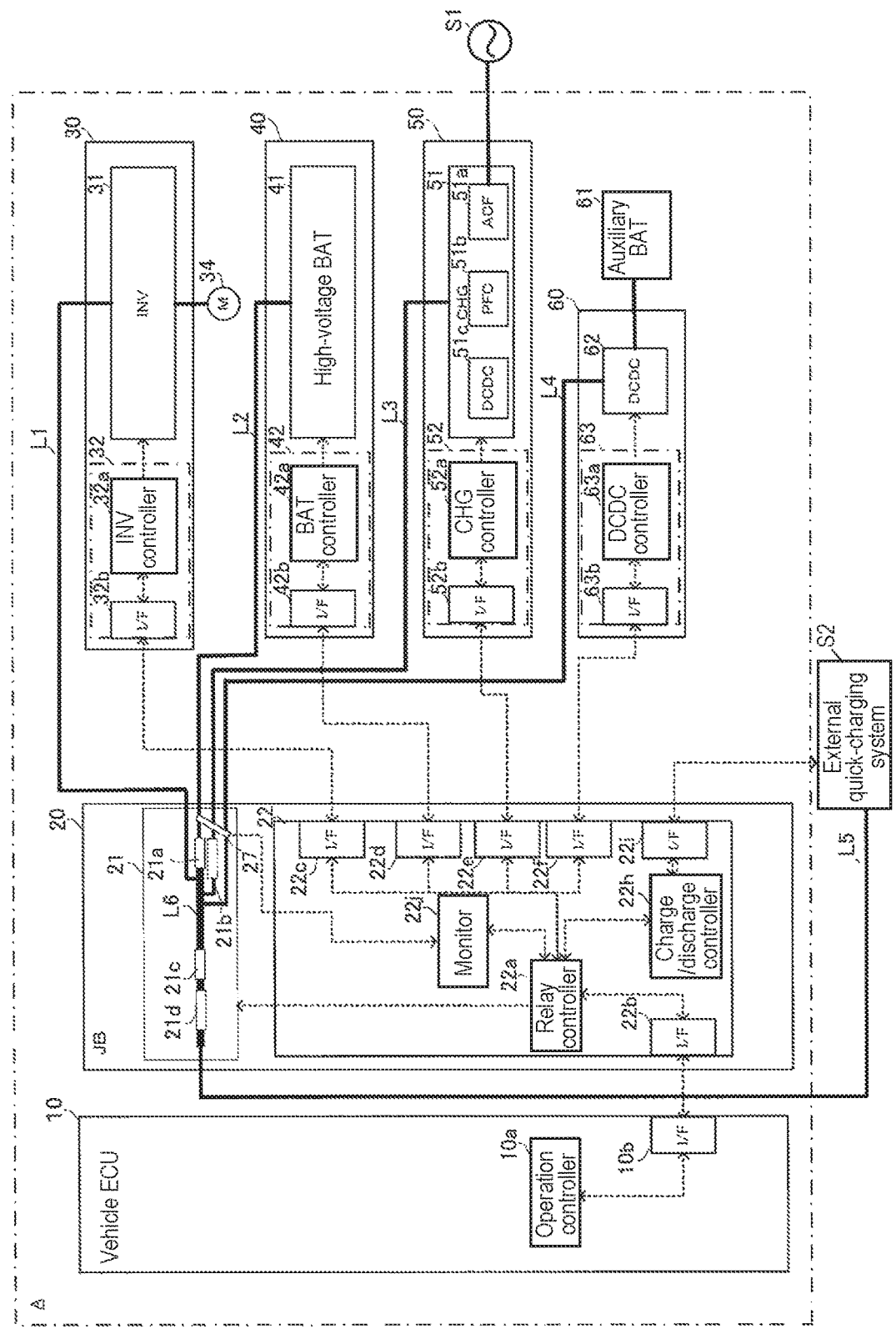
FIG. 7 is a diagram showing an example of a configuration of a vehicle according to a modified example of the sixth exemplary embodiment.

FIG. 7 is a diagram showing an example of a configuration of vehicle A according to a modified example of the sixth exemplary embodiment.

FIG. 7 is different from FIG. 6 in that current sensor 27 detects an electric current flowing in power line L2 instead of a configuration in which current sensor 27 detects an electric current flowing in power line L4.

Then, based on the detected signal from current sensor 27, an output electrical current of charger 51 is controlled such that a value of electric current supplied to high-voltage battery 41 at the time of constant-current charging becomes a maximum allowable current value.

Even with such a configuration, similar to the sixth exemplary embodiment, high-voltage battery 41 can be charged with a maximum allowable current, even when DC/DC converter 62 is operated simultaneously when high-voltage battery 41 is charged. Thus, a charging time can be shortened.

Seventh Exemplary Embodiment

As described in each of the above-mentioned exemplary embodiments, second I/Fs 22c to 22f do not rely on the specifications for communication with vehicle ECU 10. For example, they use a different standard from that of a CAN communication protocol.

Thus, even if a problem in terms of security occurs in the CAN communication protocol (for example, hacking), communication between second I/Fs 22c to 22f and power modules 30 to 60 is not immediately influenced thereby. Thus, improvement of security performance is expected.

Furthermore, when the system security level of relay controller 22a is improved, even if a security problem occurs, such a problem can be stopped at relay device 22 (relay controller 22a). Therefore, communication between second I/Fs 22c to 22f and power modules 30 to 60 can be made with a low security level. As a result, developing cost can be reduced.

Eighth Exemplary Embodiment

Figure 8:
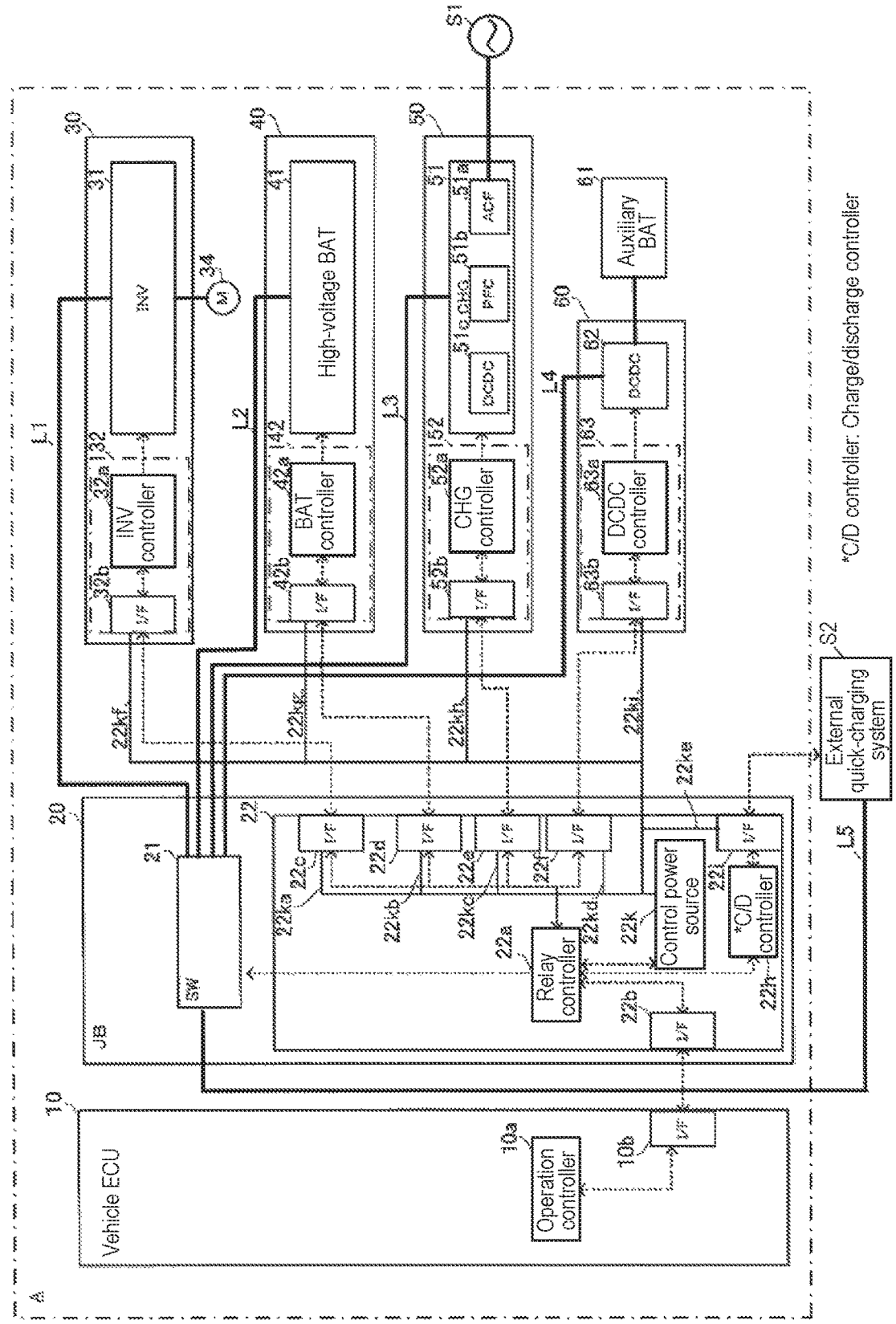
FIG. 8 is a diagram showing an example of a configuration of a vehicle according to an eighth exemplary embodiment.

FIG. 8 is a diagram showing an example of a configuration of vehicle A according to an eighth exemplary embodiment.

Vehicle A according to this exemplary embodiment is different from the third exemplary embodiment in that relay device 22 further includes control power source 22k.

Control power source 22k supplies operation power to second I/Fs 22c to 22i and electronic control units 32, 42, 52, and 63. Control power source 22k supplies power to second I/Fs 22c to 22f and electronic control units 32, 42, 52, and 63 in response to the command signal from vehicle ECU 10 obtained by relay controller 22a. Then, electronic control units 32, 42, 52, and 63 start to operate in response to the supply of operation power, respectively.

Control power source 22k is coupled to, for example, each object to be supplied with power by control power lines 22ka to 22ki for transmitting DC power, and controls a voltage of the DC power to be transmitted to each of control power lines 22ka to 22ki, and controls opening/closing of the electric path.

In this way, when relay device 22 performs management of control power source 22k, even in a case where specifications of power source to electronic control units 32, 42, 52, and 63 are different depending on types or models of vehicles (for example, in a case where power source is always necessary, or in a case where power source is necessary only at the time of starting), each type or model of vehicles can be supplied with power suitably under control to control power source 22k.

Therefore, it is not necessary to change or develop a house keeping power generator for each of electronic control units 32, 42, 52, and 63 depending on types or models of vehicles, thus enabling a developing cost to be suppressed.

Furthermore, conventionally, when electronic control units 32, 42, 52, and 63 have specifications in which they start with a starting command signal from vehicle ECU 10, electronic control units 32, 42, 52, and 63 needs to be always supplied with standby mode power in order to receive a starting command signal.

On the contrary, with relay device 22 according to this exemplary embodiment, when relay controller 22a receives a starting command signal from vehicle ECU 10, control power source 22k can selectively supply power to any, of electronic control units 32, 42, 52, and 63, to be necessarily energized. As a result, unnecessary the standby mode power (dark current) for electronic control units 32, 42, 52, and 63 can be reduced.

Note here that, in the above configuration, relay controller 22a and monitor 22j are shown separately, but both relay controller 22a and monitor 22j may be achieved by one microcomputer or DSP.

OTHER EXEMPLARY EMBODIMENTS

The present disclosure is not limited to the above-mentioned exemplary embodiments, and various modifications are considered.

The above-mentioned exemplary embodiments show various examples of relay devices 22. However, the functional configurations shown in the exemplary embodiments may be combined variously.

Furthermore, the above-mentioned exemplary embodiments show, as an example of data communication, configurations in which all the command signals from vehicle ECU 10 are transmitted to each of power modules 30 to 60 via relay device 22. However, a part of data communication, for example, communication between vehicle ECU 10 and inverter module 30 may be performed directly with each other not via relay device 22.

Furthermore, the above-mentioned exemplary embodiments show an example of a configuration of relay device 22 in which the functions of relay controller 22a are implemented by one microcomputer, but may be implemented by a plurality of microcomputers.

Furthermore, in the above-mentioned exemplary embodiments, only power modules are shown as one example of objects to which relay device 22 communicates. However, relay device 22 may communicate with vehicle modules of a vehicle auxiliary machine (for example, a compressor for an air-conditioner, a battery heater, and the like), instead of the power module, or together with the power modules. In this case, relay device 22 may have interfaces corresponding to the specifications for communicating with respective vehicle modules (interfaces that do not rely on the specifications of vehicle ECU 10).

A control device according to the present disclosure can be suitably used for a vehicle.

What is claimed is:

1. An on-board control device that relays data communication between a vehicle electronic control unit (ECU) and at least one vehicle module, the vehicle ECU being configured to generate a signal to command a driving mode of a vehicle, the on-board control device comprising:
   a first interface via which communication with the vehicle ECU is performed;
   a second interface via which communication with the at least one vehicle module is performed; and
   a monitor configured to monitor a state of power transmission and reception between a plurality of vehicle modules including the at least one vehicle module, and generates a command signal to at least one of the plurality of vehicle modules based on the state of the power transmission and reception,
   wherein the first interface relies on specifications for communication with the vehicle ECU, and
   the second interface does not rely on the specifications for communication with the vehicle ECU,
   the at least one vehicle module includes at least one power module, and,
   in response to the monitor detecting an abnormality in the state of the power transmission and reception, the command signal notifies the at least one of the plurality of vehicle modules of the abnormality.

2. The on-board control device according to claim 1, further comprising a relay controller configured to convert a command signal to the vehicle module, obtained via the first interface, into a signal that is to be transmitted to the vehicle module via the second interface.

3. The on-board control device according to claim 2, wherein the relay controller controls switching of an electric path switching circuit that switches an electric connection state of the vehicle module, based on the command signal to the vehicle module.

4. The on-board control device according to claim 1, wherein the at least one power module includes a battery module including a battery.

5. The on-board control device according to claim 4, wherein the at least one power module further includes any one of a charge module that charges the battery; an inverter module that converts power of the battery and supplies converted power to a motor; or an auxiliary module that steps down the power of the battery and charges an auxiliary battery.

6. The on-board control device according to claim 4, wherein the at least one power module further includes at least one of a charge module that charges the battery or an inverter module that converts power of the battery and supplies converted power to a motor, and
the on-board control device further comprises a charge/discharge controller configured to generate a command signal to allow at least one of the charge module or the battery module to execute a charge/discharge operation.

7. The on-board control device according to claim 1, wherein the on-board control device is installed in a junction box that relays power transmission and reception.

8. The on-board control device according to claim 7, wherein the junction box is provided with auxiliary equipment that achieves an additional function of the at least one vehicle module, and
the on-board control device further comprises an auxiliary equipment controller that controls the auxiliary equipment.

9. The on-board control device according to claim 1, wherein the monitor monitors a voltage applied to a main power line to which power lines respectively drawn from the plurality of vehicle modules are connected in common.

10. The on-board control device according to claim 1, wherein the at least one power module includes a battery module including a battery; a charge module that charges the battery; and an auxiliary module that steps down the power of the battery and charges an auxiliary battery, and
the monitor monitors an electric current flowing in a power line drawn from the auxiliary module.

11. The on-board control device according to claim 1, further comprising a control power source that supplies an operation power to an electronic control unit of the at least one vehicle module, based on a command signal to the at least one vehicle module.

12. The on-board control device according to claim 1, wherein the first interface utilizes a first communication protocol, and the second interface utilizes a second communication protocol different from the first communication protocol.

13. An on-board control device to be installed to a vehicle, the vehicle including:
   a battery module including a battery to be charged with a power supplied from an external power source outside the vehicle;
   an inverter module including an inverter circuit configured to convert a power supplied from the battery into a converted power and to supply the converted power to a motor; and
   a first controller configured to generate a signal to be used for controlling the inverter module,
   the on-board control device comprising:
      a second controller;
      a first interface via which the second controller communicates with the battery module;
      a second interface via which the second controller communicates with the first controller;
      a third interface via which the second controller communicates with a charging device configured to charge the battery with the power supplied from the external power source outside the vehicle; and
      a monitor configured to monitor a state of power transmission and reception between a plurality of vehicle modules including the battery module, and generates a command signal to at least one of the plurality of vehicle modules, based on the state of the power transmission and reception,
   wherein, in response to the vehicle travelling, the second controller communicates with the first controller via the second interface, and,
   in response to the battery being charged with the power supplied from the external power source outside the vehicle, the second controller obtains a charge state of the battery from the battery module via the first interface, and transmits a charging signal based on the charge state of the battery to the charging device via the third interface, and,
   in response to the monitor detecting an abnormality in the state of the power transmission and reception, the command signal notifies the at least one of the plurality of vehicle modules of the abnormality.

14. The on-board control device according to claim 13, wherein, in response to the battery being charged with the power supplied from the external power source outside the vehicle, the second controller transmits, via the third interface, a charging signal to a charging module which is mounted to the vehicle and includes a charger configured to convert an AC power supplied from the external power source outside the vehicle to a DC power, the charging module serving as the charging device.

15. The on-board control device according to claim 13, wherein, in response to the battery being charged with the power supplied from the external power source outside the vehicle, the second controller transmits, via the third interface, a charging signal to quick-charging equipment outside the vehicle, the quick-charging equipment serving as the charging device.

* * * * *